July 15, 1969  AKIRA KUSHIHASHI  3,455,722
GLASS HAVING A COLORED ZONE WHOSE BOUNDARY HAS BEEN BLURRED
AND METHOD OF PRODUCING THE SAME
Filed Jan. 20, 1967  2 Sheets-Sheet 2

Akira Kushihashi,
INVENTOR

BY Wenderoth,
Lind and Ponack, ATTORNEYS 3,455,722
GLASS HAVING A COLORED ZONE WHOSE BOUNDARY HAS BEEN BLURRED AND METHOD OF PRODUCING THE SAME
Akira Kushihashi, Nishinomiya-shi, Japan, assignor to Nippon Sheet Glass Co., Ltd., Osaka, Japan
Filed Jan. 20, 1967, Ser. No. 610,516
Claims priority, application Japan, Jan. 24, 1966, 41/3,701
Int. Cl. C03c 17/00; B44d 1/12
U.S. Cl. 117—45                4 Claims

ABSTRACT OF THE DISCLOSURE

A glass article having a colored zone in which the boundary between said colored zone and a noncolored zone is blurred. Said glass is made by applying to a localized zone a glass surface a thin coating of a solution of a metal compound which is to be formed into a color-imparting metal oxide, and to a surface zone which extends from a part of said localized zone over to a part of the zone adjacent thereto, a thin coating of a solution of a tin or titanium compound which is to be formed into tin oxide or titanium oxide, and oxidizing the respective compounds with the effect of heat.

---

Figure 1:
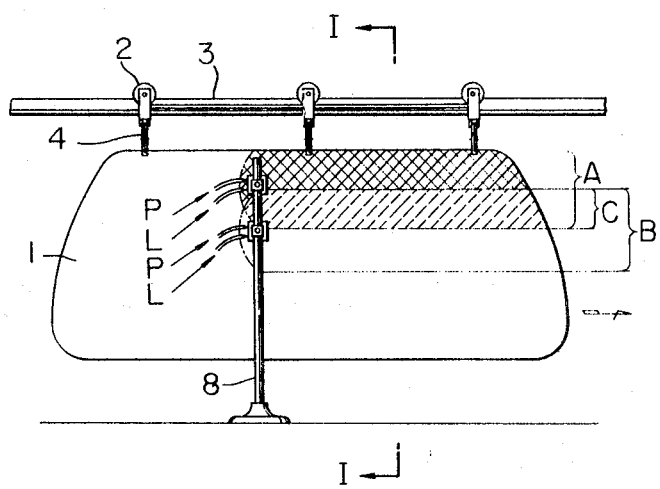

This invention relates to a glass which has been imparted coloring locally, characterized in that it has a localized surface zone imparted coloring by fixing thereon a thin coating of a color-imparting metal oxide, and in which the boundary separating this zone from its adjacent noncolored zone has been blurred. The invention also concerns a method of producing such a glass. The terminology "the boundary . . . has been blurred," as here used, means that the color of the colored zone shades off gradually into the noncolored zone.

It is known to provide the surface of a colorless glass with a colored layer by forming thereon a coating of a color-imparting metal oxide. The most commonly practiced method comprises either first heating the glass to below its melting temperature and then spraying on the surface thereof a solution containing a metal salt or a mixture of metal salts which are to be formed into the color-imparting metal oxide, or first spraying on the surface of the glass said solution of the metal salt and thereafter heating the glass at the aforesaid temperature, thereby oxidizing the metal salt by the effect of the heat as well as fixing the so formed color-imparting metal oxide to the surface of the glass. In spraying the solution of metal salt, the surface zone not intended to be colored is either covered with a protective material or the protective material is placed in an intervening position to ensure that the spray solution is not applied to this zone. The so obtainable sheet glass or curved glass sheet having a partitioned colored zone is useful as window glass for automobile, aircraft, train and other vehicles, wherein it can not only fulfill its viewing function but can also serve as a sunshade. However, in a glass of this sort, if the colored and non-colored zones are partitioned with a distinct boundary, this becomes very offensive to the eye and affects undesirably the visibility.

For the blurring this distinct boundary, it is possible to dilute the concentration of the spray in the vicinity of the boundary. However, in this case, not only does the color of the metal oxide coating in the boundary region become spotty, but also with the reflectivity in those portions where the thickness of the coating is excessively thin being great, these portions appear as silvery white or pearly spots to impair greatly the viewing properties of the glass as well as its appearance.

The object of this invention is to provide a glass product having a colored zone whose boundary has been blurred and thus not possessing the hereinbefore described drawbacks.

The glass according to this invention is a glass having a blurred boundary between a localized colored zone on its surface and the adjacent noncolored zone, the surface of the partition zone of the glass being fixed with a thin coating of a color-imparting metal oxide, and the zone extending from a part of said colored zone over to a part of the adjacent noncolored zone being fixed with a thin coating of tin oxide or titanium oxide.

The foregoing glass is produced according to this invention by a method which comprises applying to a partitioned zone of a glass surface a thin coating of a solution of a metal compound which is to be formed into a color-imparting metal oxide, and to a zone which extends from a part of the foregoing partitioned zone over to a part of the zone adjacent thereto, a thin coating of a solution of a tin compound or a titanium compound which is to be formed into tin oxide or titanium oxide, oxidizing the respective compounds with the effect of heat, thereby fixing the aforesaid coated zones with thin coatings of respectively a color-imparting metal oxide and tin oxide or titanium oxide. The heat in the foregoing method can either be provided by the heat possessed by the glass which has been heated in advance of the application of the solutions of said color-imparting metal compound and tin compound or titanium compound to a temperature sufficient to oxidize said compounds but below the melting temperature of the glass, or to be provided by heating the glass to the foregoing temperature range after application of the aforesaid solutions. Thus a glass is obtained in which the color gradually shades off from the colored zone into the noncolored zone to render inconspicuous the spots of the color-imparting metal oxide in the vicinity of the boundary.

The metal compounds which can be used for forming the color-imparting metal oxides include a wide variety of organic and inorganic metal salts or mixtures thereof, which are known in the art. Typical examples are given below with the color imparted being shown in parentheses:

The cobalt salts such as cobalt acetate, cobalt chloride and cobalt nitrate (yellowish to dark brown); the copper salts such as copper acetate and copper nitrate (light brown); the iron salts such as ferric chloride (yellow to yellowish brown); the lead salts such as lead chloride (light yellow); the chromium salts such as chromium chloride (green); the mixed salt of antimony trichloride and stannic chloride (blue); the mixed salt of antimony trichloride and bismuth chloride (yellowish brown).

These metal compounds are oxidized in air at elevated temperatures to form their corresponding colored metal oxides.

The coatings of both cobalt oxide and iron oxide not only excel in their reflectivity to thermic rays but also do not fatigue the eyes, and hence they are particularly preferred as window glass for viewing use. The other various metal salts, which have been enumerated hereinbefore, are used in accordance with the color desired.

The tin compounds or titanium compounds which are used for forming tin oxide or titanium oxide are compounds which are oxidized in air at elevated temperatures. The organic or inorganic salts of tin are preferred, typical examples of which are stannic chloride, dimethyl tin chloride and dibutyl tin diacetate and examples of the most preferable titanium compound used are tetraisopropyl titanate, tetrabutyl titanate and titanium acetylacetonate. Either the thin coating of tin oxide and titanium oxide is colorless and transparent.

For preparing the solutions of the aforementioned various color-imparting metal compounds and tin compounds or titanium compounds, water or an organic solvent which dissolves these compounds well is used in accordance with the class of compound being used. The organic solvents include the lower alcohols such as methyl, ethyl, isopropyl and n-butyl alcohol, as well as benzene, acetone and the like.

In applying the solution of the metal compound having the property of forming a color-imparting metal oxide, or the solution of the tin compound or titanium compound having the property of forming a tin oxide or titanium oxide, to the prescribed zone of a glass surface, the former is first applied to the predetermined partitioned zone, following which the latter is applied in such a fashion that the boundary is covered with the coating overlapping into a part of the partitioned zone. However, if circumstances require, both may be applied to their respective prescribed zones concurrently. The method of application of the solutions can be by spraying, brushing on or other suitable methods. Usually, spraying is the most convenient.

The thickness of the coating to be applied to the glass surface is suitably in a range between 20 and 70 m$\mu$ in the case of the color-imparting metal oxide and 10 to 60 m$\mu$ in the case of the tin oxide or titanium oxide.

When the solution of the aforesaid color-imparting metal compounds and the solution of the tin compound or titanium compound are applied to the surface of a glass which has been heated in advance, the heat retained by the glass immediately causes an evaporation of the solvent and oxidation of the compounds to take place, thereby fixing the respective oxides securely to the glass surface. The temperature to which the glass is heated is a temperature which is below the melting temperature of the glass but sufficient to oxidize the compounds applied. The oxidation of the compounds readily takes place at above 400° C. In order that the operation can be carried out promptly, usually a temperature of above 500° C. is preferred. When the solutions are applied to the glass at room temperature, the glass is placed in an oven thereafter and heated at the foregoing temperature.

The effects of the tin (or titanium) compound solution are that the coating of its oxide is colorless, that this oxide is very readily fixed to the glass surface and that spots do not occur by its application by spraying. The tin (or titanium) compound solution, unlike the solution of the color-imparting metal compounds, does not adhere in a spotty manner but forms a uniform coating. Further, the refractive index of its oxide coating is great. It is believed that as a result of these properties of the tin (or titanium) oxide coating operating conjointly it becomes adhered to the vicinity of both the colored and noncolored zones to become fixed as a protective coating covering the highly reflective spots formed by the color-imparting metal oxide, in consequence of which the reflectivity of the spaces between the spots is increased to render the spots inconspicuous and form a boundary zone whose appearance is practically uniform.

Figure 2:
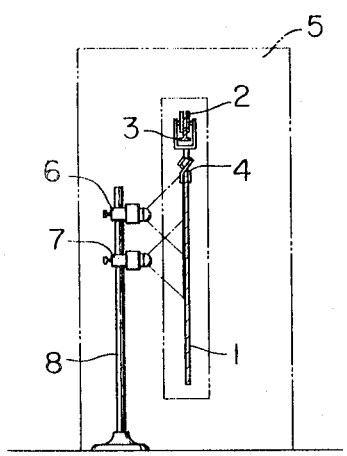
Figure 3:
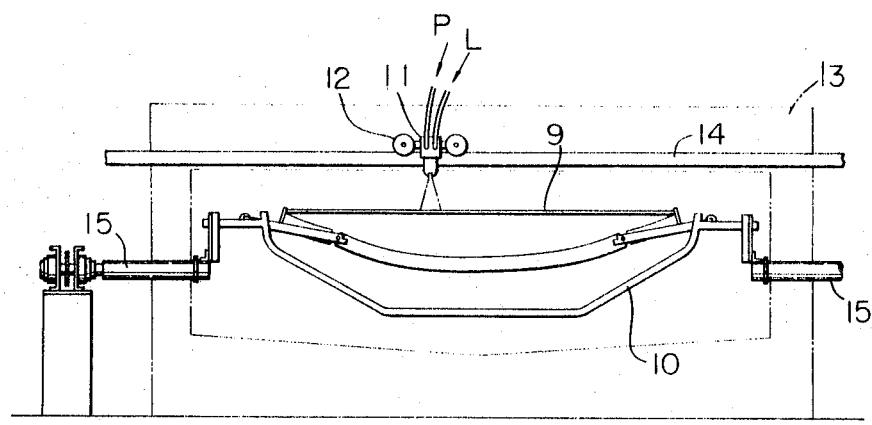
Figure 4:
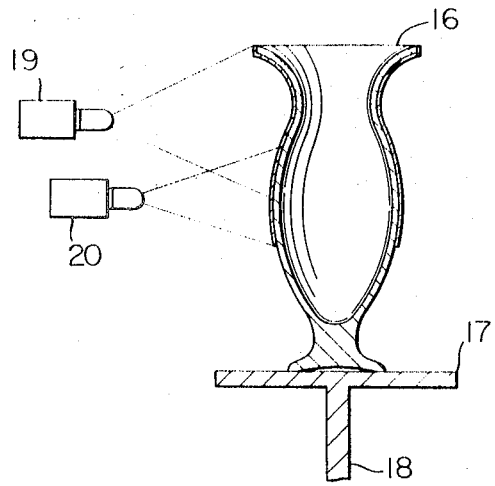

The invention will now be illustrated by means of the following examples with reference being had to the accompanying drawings, wherein: FIG. 1 illustrates one mode of practicing this invention. This figure is an elevation showing where a perpendicularly held glass sheet passes in front of an apparatus for spraying the color-imparting metal salt solution and the tin (or titanium) compound solution. FIG. 2 is a view in cross-section taken along line I—I of FIG. 1. FIG. 3 is an elevation illustrating another mode of practicing this invention. In this mode the glass is being sprayed with the color-imparting metal salt solution while being held in a lateral position. FIG. 4 is an elevation showing a further mode of practicing the invention.

EXAMPLE 1

In FIGS. 1 and 2, glass sheet 1, which is to be used as a windowpane of an automobile, is cut in advance to fit its framework. One edge of this glass sheet is held and suspended perpendicularly from a suspending means 4 which, by having a wheel 2 at its upper part, is mounted so as to be movable over a monorail 3. Monorail 3 passes through an oven 5 from whence it continues to the spraying room. Oven 5 is maintained at 650° C. After a hold time of 5 minutes in the oven 5, the glass sheet 1 is passed through the spraying room at the rate of 200 cm./min. Sprayers 6 and 7, which are mounted on a stand 8, are fed compressed air and the spraying solutions from P and L, respectively. While continuously spraying the solutions from the sprayers, the heated glass sheet is moved along the front of the sprayers in the arrow direction. Hence, while the glass sheet passes in front of the sprayers, the solutions are caused to adhere to the surface of the glass sheet continuously in the direction of the travel of the glass to form a coating thereon immediately after adhering to the glass.

A cobalt acetate solution of a concentration of 30 grams of $Co(CH_3CO_2)_2 \cdot 4H_2O$ in 120 ml. of ethanol was sprayed from the sprayer 6 at the rate of 200 ml./min. against the glass sheet along its upper edge in a strip about one foot (30.5 cm.) wide. At the same time, a stannic chloride solution of a concentration of 40 grams of $SnCl_4 \cdot 2H_2O$ in 100 ml. of water was sprayed from the sprayer 7 at the rate of 18 ml./min. against a zone extending from a part of the cobalt acetate solution-sprayed zone to the unsprayed zone. In the figure, A indicates the cobalt acetate solution-sprayed zone while B is the zone onto which the stannic chloride solution was sprayed.

After spraying, the part to which only the stannic chloride solution was fixed remained transparent and the part to which only the cobalt acetate solution was fixed became yellowish brown in color. On the other hand, in the case of part C which extended over the two zones of A and B, the color gradually shaded off from the A zone into the B zone. Furthermore, the so obtained glass sheet for automotive window use was one in which no cobalt oxide spots were noticeable. In the above example, using a solution of a concentration of 30 grams of tetraisopropyl titanate in 100 ml. of isopropanol instead of a stannic chloride solution at a rate of 15 ml./min., the treatment was carried out in the same manner with the same result.

EXAMPLE 2

In FIG. 3, a glass sheet 9 to be used as a windowpane of an automobile was cut in advance to fit its framework. This glass sheet is held horizontally above a bending mold 10. Sprayer 11 provided with wheels 12 is adapted to travel over a rail 14 along the front of an oven 13 in a direction transversely of the oven. While moving the sprayer 11 along the rail 14, the solution is sprayed against the glass sheet by feeding compressed air and the spray solution from P and L, respectively. 15 are the drive rolls for moving the bending mold 10.

First, a ferric chloride solution consisting of 25 grams of $FeCl_3 \cdot 6H_2O$ in 180 ml. of water was sprayed against the glass sheet 9 along one edge thereof. This was followed by spraying a stannic chloride solution consisting of 40 grams of $SnCl_4 \cdot 2H_2O$ in 100 ml. of water, against a zone extending from a part of the zone sprayed with the ferric chloride solution to the previously unsprayed zone. Thereafter the glass sheet was heated by introducing the bending mold 10 into the oven 13 maintained at 650° C.

After the glass sheet 9 was imparted the prescribed curve by means of the bending mold 10, the mold 10 was removed from the oven 13 and the glass sheet 9 was tempered by blowing cold air against both sides thereof.

Thus was obtained a curved tempered glass sheet for automotive window use having along its one edge a yellowish-brown colored zone in which the color gradually shaded off into the noncolored zone and in which no ferric chloride spots were noticeable.

EXAMPLE 3

In FIG. 4, the numeral 16 is a glass vase placed atop a disk 17 of a potter's wheel. While rotating spindle 18 of the potter's wheel, a cobalt acetate solution and a stannic chloride solution, as used in Example 1, were sprayed against the peripheral surface of the vase from sprayers 19 and 20, respectively.

The vase was then heated at 600° C. in an oven (not shown) to obtain a beautiful vase having a yellowish-brown colored zone which gradually shaded off into the noncolored zone and in which no spots were noticeable.

What is claimed is:

1. A method of producing a glass having a colored zone and a noncolored zone in which the color of said colored zone shades off gradually toward the noncolored zone, comprising applying to a localized area of the glass surface a thin coating of a solution of a metal compound heat-transformable to a colored oxide, applying a thin coating of solution of a metal compound selected from the group consisting of tin compounds and titanium compounds to an area partially overlapping said localized area and extending into an area outside said localized area and free of said color-forming compound, and oxidizing the respective compounds on the glass surface with heat, thereby forming and fixing both oxides in their respective areas of application.

2. A method according to claim 1 wherein said heat is provided by heating the glass to a temperature sufficient to oxidize said compounds but below the melting temperature of the glass, said heating being effected prior to application of said solution of the color-imparting metal compound and tin compound or titanium compound to the glass.

3. A method according to claim 1 wherein said heat is provided by heating the glass to a temperature sufficient to oxidize said compounds but below the melting temperature of the glass, said heating being effected after application of said solutions of the color-imparting metal compound and tin compound or titanium compound to the glass.

4. A glass having a colored zone and a noncolored zone in which the color of said colored zone shades off gradually toward the noncolored zone, said colored zone being colored by a coating of a color-imparting metal oxide and said glass having an oxide selected from the group consisting of tin oxide and titanium oxide, as a coating that partially overlaps said colored oxide coating and extends into the noncolored zone, and which is produced by the process of claim 1.

References Cited

UNITED STATES PATENTS 3,244,547  4/1966  Orr et al. _____ 117—33.3

S. LEON BASHORE, Primary Examiner

JOHN H. HARMAN, Assistant Examiner

U.S. Cl. X.R.

65—30, 60; 117—37, 124